(12) United States Patent
Hukkeri et al.

(10) Patent No.: US 9,279,882 B2
(45) Date of Patent: Mar. 8, 2016

(54) MACHINE SENSOR CALIBRATION SYSTEM

(75) Inventors: Ramadev Burigsay Hukkeri, Peoria, IL (US); Thandava Krishna Edara, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1222 days.

(21) Appl. No.: 12/232,565

(22) Filed: Sep. 19, 2008

(65) Prior Publication Data

US 2010/0076708 A1 Mar. 25, 2010

(51) Int. Cl.
*G01S 7/40* (2006.01)
*G01S 7/497* (2006.01)
*G01S 7/52* (2006.01)

(52) U.S. Cl.
CPC . *G01S 7/40* (2013.01); *G01S 7/497* (2013.01); *G01S 7/52004* (2013.01); *G01S 7/4972* (2013.01); *G01S 2007/4082* (2013.01)

(58) Field of Classification Search
CPC ....... G01S 7/40; G01S 7/497; G01S 7/52004; G01S 2007/4082; G01S 7/4972
USPC .............................. 702/94, 95, 151, 152, 153
See application file for complete search history.

(56) References Cited

U.S. PATENT DOCUMENTS

| | | | |
|---|---|---|---|
| 5,531,377 A | 7/1996 | Thayer et al. | |
| 6,192,315 B1 | 2/2001 | Geschke et al. | |
| 6,215,438 B1* | 4/2001 | Oswald et al. | 342/70 |
| 6,393,370 B1 | 5/2002 | Soika | |
| 6,542,840 B2* | 4/2003 | Okamoto et al. | 702/94 |
| 6,560,555 B1 | 5/2003 | Mallory | |
| 6,594,600 B1* | 7/2003 | Arnoul et al. | 702/94 |
| 6,691,549 B2 | 2/2004 | Froeschl et al. | |
| 6,768,956 B2 | 7/2004 | Hayashi | |
| 6,778,928 B2 | 8/2004 | Stiller | |
| 7,202,776 B2 | 4/2007 | Breed | |
| 7,225,060 B2 | 5/2007 | O'Connor et al. | |
| 7,337,650 B1 | 3/2008 | Preston et al. | |
| 7,359,816 B2 | 4/2008 | Kumar et al. | |
| 2006/0164295 A1 | 7/2006 | Focke et al. | |
| 2007/0010942 A1* | 1/2007 | Bill | 701/209 |
| 2007/0041659 A1* | 2/2007 | Nobori et al. | 382/284 |
| 2007/0047940 A1* | 3/2007 | Matsumoto et al. | 396/106 |
| 2007/0150221 A1 | 6/2007 | Babala et al. | |
| 2007/0173987 A1 | 7/2007 | Rowe et al. | |
| 2008/0035402 A1* | 2/2008 | Amira et al. | 180/211 |
| 2008/0300787 A1* | 12/2008 | Zeng | 701/301 |
| 2009/0033926 A1* | 2/2009 | Haug | 356/243.1 |

* cited by examiner

*Primary Examiner* — Alexander Satanovsky
(74) *Attorney, Agent, or Firm* — Finnegan, Henderson, Farabow, Garrett & Dunner, LLP

(57) ABSTRACT

A sensor calibration system for a mobile machine is disclosed. The sensor calibration system may have a positioning device configured to determine a desired sensing location on the mobile machine, a calibration object, and a sensor configured to sense a characteristic of the calibration object from an actual sensing location on the mobile machine and to generate a corresponding signal. The sensor calibration system may also have a controller in communication with the sensor and the positioning device. The controller may be configured to compare the characteristic sensed from the actual sensing location to a known characteristic associated with the desired sensing location, and to determine a difference between the actual sensing location and the desired sensing location based on the comparison. The controller may further be configured to correct subsequent signals generated by the sensor based on the difference.

18 Claims, 5 Drawing Sheets

MACHINE SENSOR CALIBRATION SYSTEM

TECHNICAL FIELD

The present disclosure relates generally to a calibration system and, more particularly, to a sensor calibration system for a mobile machine.

BACKGROUND

Machines such as, for example, off-highway haul trucks, motor graders, snow plows, and other types of heavy equipment are used to perform a variety of tasks. Some of these tasks involve carrying or pushing large, awkward, loose, and/or heavy loads up steep inclines or along rough or poorly marked haul roads. And, because of the size and momentum of the machines and/or because of poor visibility, these tasks can be difficult for a human operator to complete effectively.

To help guide the machines safely and efficiently along the haul roads, some machines are equipped with sensors, for example, RADAR sensors, SONAR sensors, LIDAR sensors, IR and non-IR cameras, and other similar sensors. These sensors are often connected to a visual display and/or a guidance system of the machine such that control over machine maneuvering may be enhanced or even automated. In order for these display and guidance systems to operate properly, the information provided by the sensors must be accurate. And, even though most machine sensor systems are calibrated when first commissioned, vibrations, collisions, and damage to the machine during operation can reduce the quality of information provided by the sensors. As such, periodic recalibration can be beneficial.

An exemplary recalibration system and method is described in U.S. Patent Publication No. 2006/0164295 (the '295 publication) by Focke et al. published on Jul. 27, 2006. Specifically, the '295 publication describes a system for simultaneous calibration of two different types of sensors, for example an image sensor and a radar sensor mounted on a motor vehicle. During calibration of the two sensors, the motor vehicle is aligned in front of a calibration object in such a way that the image and radar sensors detect reference features of the calibration object and responsively create calibration data. The calibration data used directly for calibration of the participating sensors. For example, the calibration data is used for automatic correction of a deviation of a sensor axis in relation to a vehicle longitudinal axis or by an automotive technician for mechanical adjustment of sensor placement. These procedures are possible during manufacture or repair of the motor vehicle.

Although the sensor system of the '295 publication may be helpful in recalibrating machine-mounted sensors, the benefit may be limited. That is, for optimum accuracy, the machine of the '295 publication must be precisely aligned relative to the calibration object. Any error in this alignment may result in an accuracy reduction of the sensed information. In addition, the mechanical adjustment of the sensor location on the motor vehicle may be time consuming and expensive, while the automated calibration described in the '295 patent (i.e., about only the sensor axis) may be limited.

The disclosed sensor calibration system is directed to overcoming one or more of the problems set forth above and/or other problems of the prior art.

SUMMARY

In one aspect, the present disclosure is directed to a sensor calibration system for a mobile machine. The sensor calibration system may include a positioning device configured to determine a desired sensing location on the mobile machine, a calibration object, and a sensor configured to sense a characteristic of the calibration object from an actual sensing location on the mobile machine and to generate a corresponding signal. The sensor calibration system may also include a controller in communication with the sensor and the positioning device. The controller may be configured to compare the characteristic sensed from the actual sensing location to a known characteristic associated with the desired sensing location, and to determine a difference between the actual sensing location and the desired sensing location based on the comparison. The controller may further be configured to correct subsequent signals generated by the sensor based on the difference.

In yet another aspect, the present disclosure is directed to a method of calibrating a sensor mounted on a mobile machine. The method may include positioning the mobile machine proximate a calibration object, and sensing a characteristic of the calibration object from an actual sensing location on the mobile machine. The method may further include comparing the characteristic sensed from the actual sensing location to a known characteristic associated with a desired sensing location. The method may also include determining a difference between the actual sensing location and the desired sensing location based on the comparison, and correcting subsequent characteristics sensed from the actual sensing location based on the difference.

DETAILED DESCRIPTION

Figure 1:
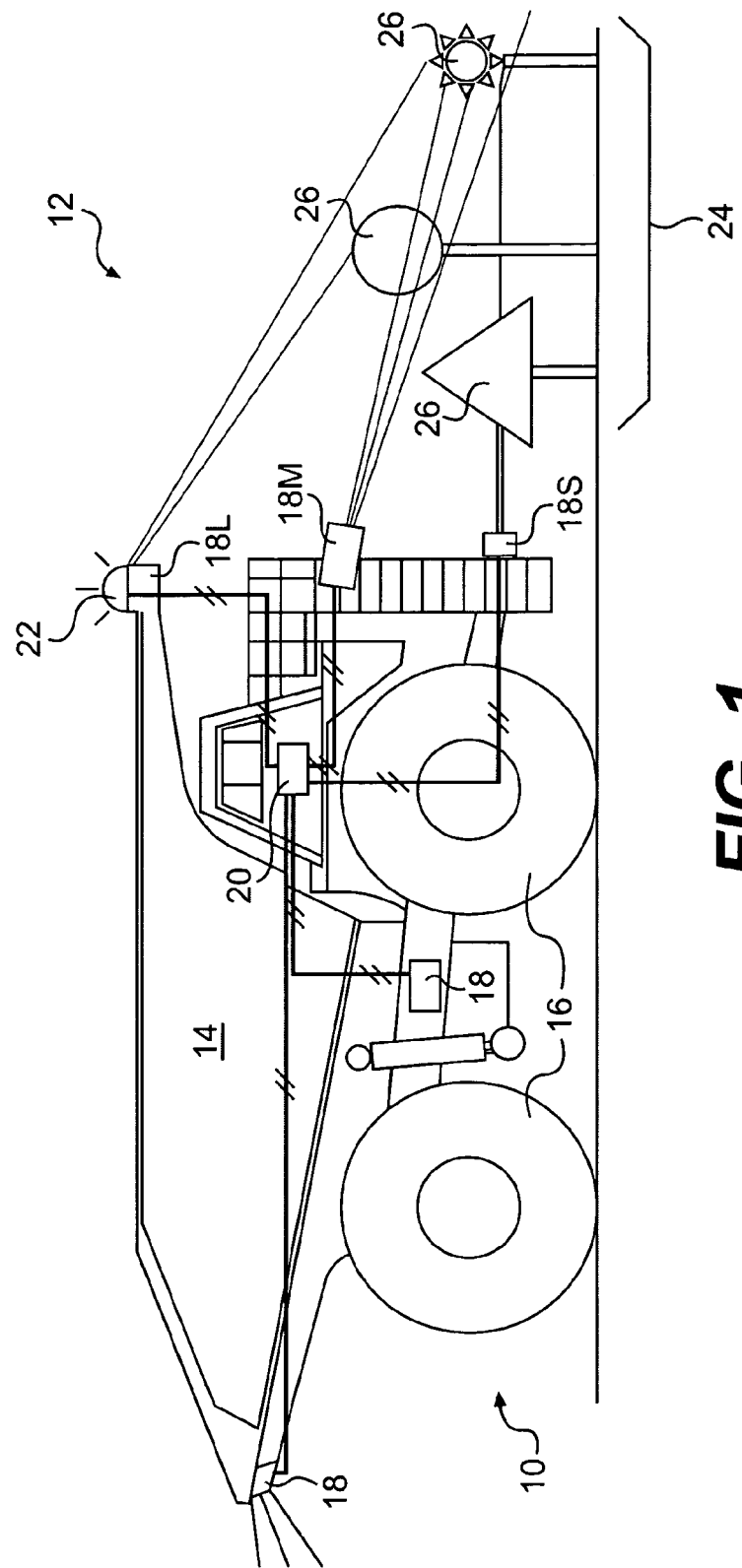
FIG. 1 is a side-view pictorial illustration of a machine having an exemplary disclosed sensor calibration system.

FIG. 1 illustrates a machine 10 having an exemplary sensor calibration system 12. Machine 10 may embody a mobile machine, for example an earth moving machine such as a haul truck, a wheel loader, a motor grader, or any other mobile machine known in the art. Machine 10 may include, among other things, a body 14 supported by one or more traction devices 16, and one or more sensors 18 mounted to body 14 and used for obstacle detection, collision avoidance, environmental display, autonomous guidance and/or other similar purposes. Sensor calibration system 12 may be used to selectively calibrate sensors 18 to improve the accuracy of information provided by sensors 18.

In one embodiment, machine 10 may be equipped with short range sensors 18S, medium range sensors 18M, and long range sensors 18L located at different positions around body 14 of machine 10. Each sensor 18 may embody a device that detects and ranges objects, for example a LIDAR (light detection and ranging) device, a RADAR (radio detection and ranging) device, a SONAR (sound navigation and ranging) device, a camera device, or another device known in the art. In one example, sensor 18 may include an emitter that emits a detection beam, and an associated receiver that receives a reflection of that detection beam. Based on characteristics of the reflected beam, a distance and a direction from an actual sensing location of sensor 18 on machine 10 to a portion of the sensed object may be determined. Sensor 18 may then generate a position signal corresponding to the distance and direction, and communicate the position signal to a controller 20 of sensor calibration system 12 for subsequent conditioning, display, and/or control of machine 10.

Figure 2:
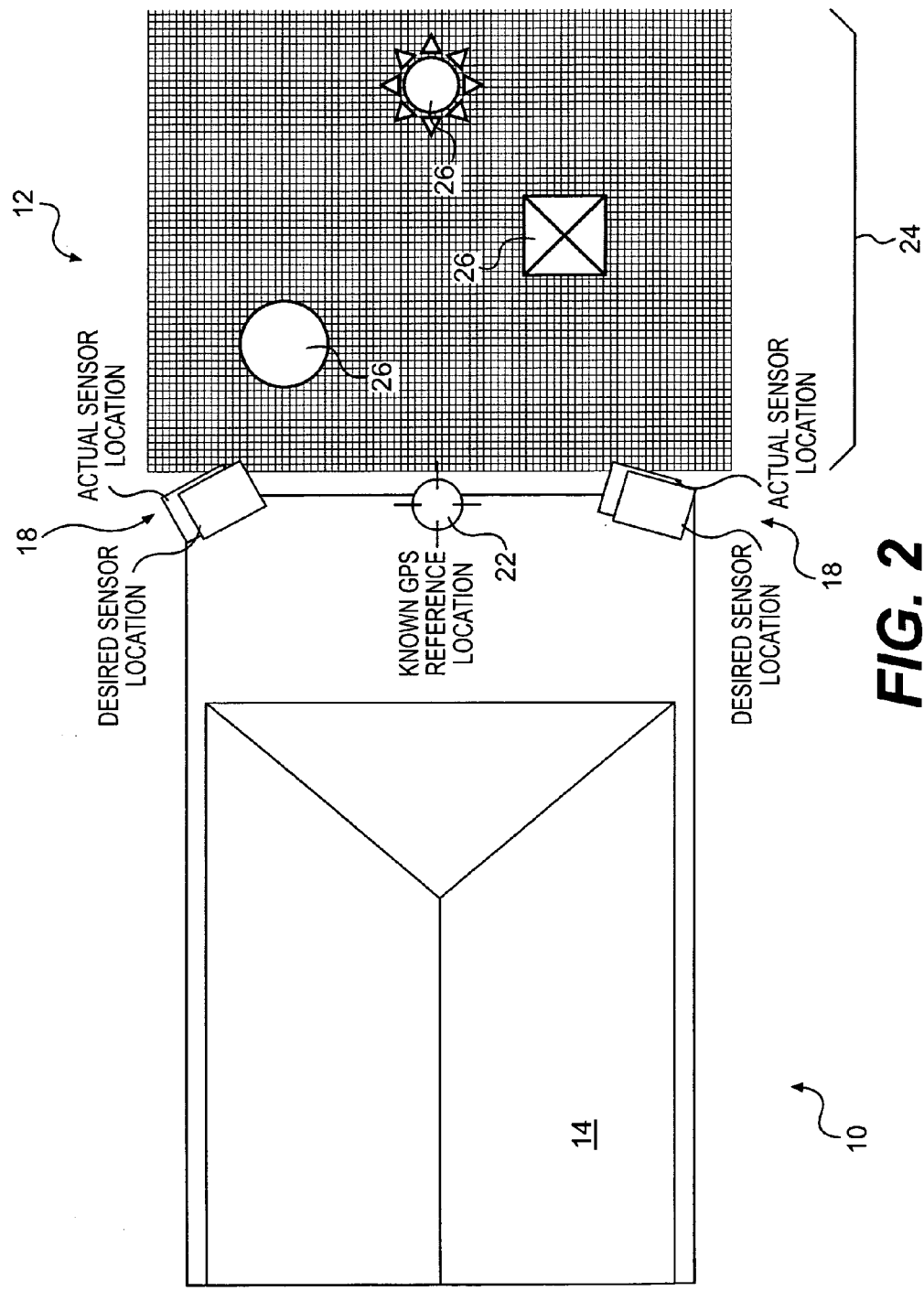
FIG. 2 is a top-view pictorial illustration of the machine and sensor calibration system of FIG. 1.

In order for the information provided by sensors 18 to be most accurate and useful, the actual sensing location of sensor 18 should be precisely known, and a deviation from a desired sensing location accounted for. In one example, as shown in FIG. 2, there exists a desired sensing location on body 14 for each sensor 18. The desired sensing location may correspond with a preprogrammed set of instructions regarding manipulation of information received from sensor 18 and/or a geometric relationship between a reference location on machine 10 and the desired sensing location. Ideally, the actual sensing location of each sensor 18 substantially matches the desired sensing location. However, errors incurred during assembly and undesired movement of sensors 18 during operation of machine 10 may cause the actual sensing location to shift away from the desired sensing location.

Controller 20 may include means for monitoring, recording, conditioning, storing, indexing, processing, and/or communicating information received from sensors 18. These means may include, for example, a memory, one or more data storage devices, a central processing unit, or any other components that may be used to run the disclosed application. Furthermore, although aspects of the present disclosure may be described generally as being stored within memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Sensor calibration system 12 may include a positioning device 22 and a calibration object 24 used by controller 20 during calibration of sensors 18. Positioning device 22 may be configured to determine a geographical location of machine 10. In particular, positioning device 22 may embody an electronic receiver configured to communicate with one or more satellites or a local radio or laser transmitting system to determine a relative location of itself and thus a reference location on machine 10. In these embodiments, positioning device 22 may receive and analyze high-frequency, low power radio or laser signals from multiple locations to triangulate a relative 3-D position of the reference location. Alternatively, positioning device 22 may embody an Inertial Reference Unit (IRU) or another known positioning device operable to receive or determine localization information associated with machine 10. A location signal indicative of the reference location position on machine 10 may be communicated from positioning device 22 to controller 20.

Calibration object 24 may include one or more features 26 positioned at known relative locations. In one example, calibration object 24 may include features 26 positioned at different heights, at different distances from machine 10 and from each other, and at different angles relative to the reference location on machine 10. In addition, features 26 may each include characteristics detectable by sensors 18, for example a width, a height, a shape, a size, an orientation, a surface finish, a material composition, a reflectivity, etc. In one embodiment, features 26 may include characteristics recognizable by different types of sensors 18 (e.g., RADAR, LIDAR, SONAR, camera, etc.) such that multiple types of sensors 18 may be simultaneously calibrated with calibration object 24. In one example, features 26 of calibration object 24 may be fixed at a particular location and substantially unmovable.

Controller 20 may be configured to calibrate sensors 18 based on position signals received from sensors 18 during detection of calibration object 24 and based on signals received from positioning device 22. That is, controller 20 may, based on a position of the machine reference location relative to calibration object 24, as provided by positioning device 22, and based on actual sensing locations of sensors 18, reference a feature map stored in memory. The feature map may be a map of characteristics associated with each feature 26 of calibration object 24, as previously detected from the desired sensing location of each sensor 18. In one example, controller 20 may include a plurality of maps stored in memory, each map corresponding to a different position of the machine reference location relative to calibration object 24, different actual sensing locations of sensors 18, different types of sensors 18 being used/calibrated, etc. Controller 20 may compare signals received from each sensor 18 at their actual sensing locations to values found within the maps corresponding to the desired sensing locations and reference location of machine 10 relative to calibration object 24. If the signals indicate that the sensed characteristics of features 26 substantially match (i.e., match within an acceptable threshold margin) the known and mapped characteristics, it can be concluded that the actual sensing location of sensors 18 substantially match the desired sensing locations and the information provided by sensors 18 may be sufficiently accurate. However, if the signals indicate that the sensed characteristics of features 26 differ significantly from the mapped characteristics, it can be concluded that the actual sensing location of sensors 18 are substantially different from the desired sensing locations and calibration of one or more of sensors 18 may be required to improve the information accuracy of sensors 18.

Figure 3:
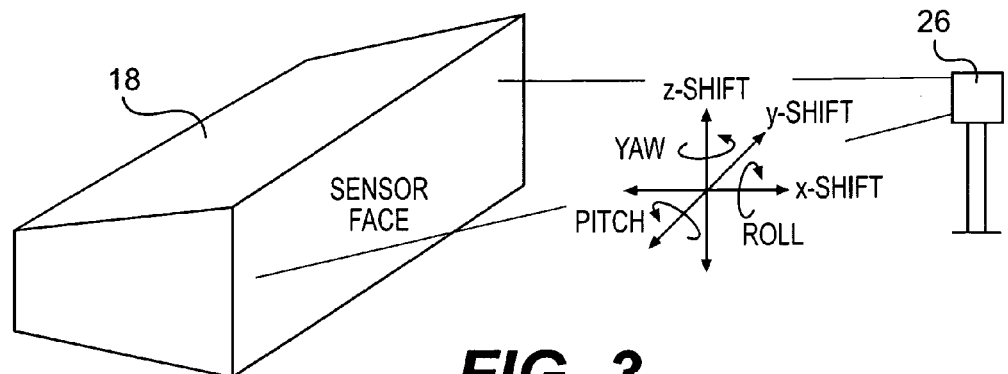
FIG. 3 is a diagrammatic illustration of an exemplary disclosed relationship between portions of the calibration system of FIGS. 1 and 2.
Figure 4:
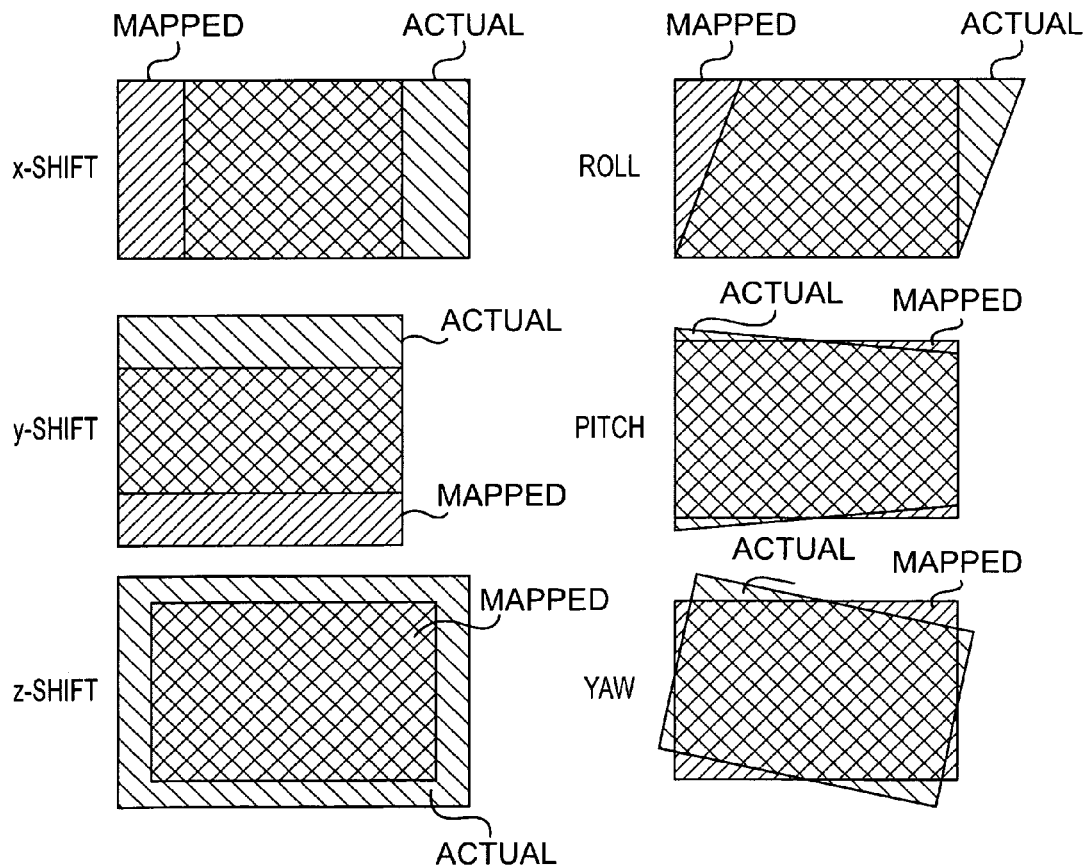
FIG. 4 is a diagrammatic illustration of an exemplary disclosed operation performed by the sensor calibration system of FIGS. 1 and 2 while the machine is substantially stationary.

Controller 20 may calibrate sensor 18 by determining transformations required to correct characteristics of features 26 detected from the sensors' actual sensing location (i.e., by determining transformations required to make the sensed characteristic information substantially match the mapped characteristic information). Specifically, as shown in FIG. 3, it may be possible for the actual sensing location of each sensor 18 to be shifted in any of three directions (x, y, and z) and/or to be rotated about any of three axis (an x-axis, a y-axis, and a z-axis) relative to its desired position. When detecting characteristics of features 26 from the shifted and/or rotated position, characteristics of features 26 may be skewed and, when comparing the characteristics sensed from the shifted and/or rotated positions to mapped characteristics, the skew may become detectable. For example, as seen in the upper left image of FIG. 4, feature 26, as detected by one of sensors 18, is shown to be shifted in the x-direction. To correct information provided by this sensor 18, all signals received from this sensor 18 should be conditioned with an x-shift transformation before the information can become useful. The middle left image shows feature 26 being shifted in the y-direction. To correct information provided by this sensor 18, all signals received from this sensor 18 should be conditioned with a y-shift transformation. The lower left image shows feature 26 being shifted in the z-direction. To correct information provided by this sensor 18, all signals received from this sensor 18 should be conditioned with a z-shift transformation. The three right-most images of FIG. 4 show similar rotation errors that should be corrected with respective roll, pitch, and yaw transformations. It is contemplated that additional linear or nonlinear transformations for time, material composition, surface finish, sensor material property inconsistencies or defects, etc. may be utilized, if desired.

Controller 20 may have stored in memory algorithms associated with each required transformation. That is, controller 20 may have stored in memory an x-transformation algorithm, a y-transformation algorithm, a z-transformation algorithm, a roll-transformation algorithm, a pitch-transformation algorithm, and a yaw-transformation algorithm. During a calibration event when machine 10 is positioned proximate calibration object 24, controller 20 may selectively determine which of sensors 18 requires calibration by comparing sensed characteristics of features 26 to mapped characteristics. And, when the sensed characteristics significantly differ from the mapped characteristics, controller 20 may select corresponding transformation algorithms from those stored in memory and apply the algorithm to future signals received from the sensors 18 requiring calibration, based on position information of the machine reference location provided by positioning device 22.

Figure 5:
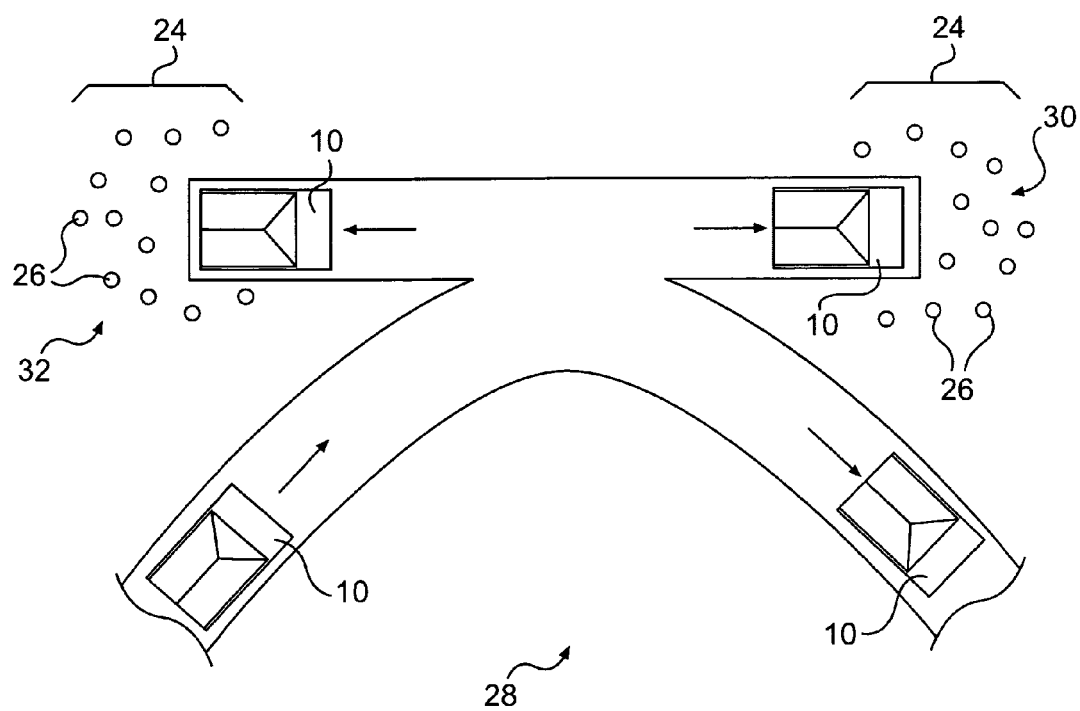
FIG. 5 is a diagrammatic illustration of an exemplary disclosed operation performed by the machine and sensor calibration system of FIGS. 1 and 2.

In one example, shown in FIG. 5, calibration object 24 may be located at a worksite 28. Worksite 28 may include, for example, a mine site, a landfill, a quarry, a construction site, or any other type of worksite known in the art. Machine 10 may be configured to complete a primary task at worksite 28 associated with altering a current geography. For example, the primary tasks may include a grading operation, a leveling operation, a bulk material removal operation, a service operation (e.g., fueling), a maneuvering operation (e.g., turning around), or any other type of operation that results in or is associated with alteration of the current geography at worksite 28. For the purposes of this disclosure, a primary task may be considered a task substantially unrelated to sensor calibration. It is contemplated that machine 10 may complete multiple primary tasks during a single work shift or during a single work cycle, for example a first primary task associated with bulk material removal, a second primary task with turning around, a third primary task associated with refueling, etc. As machine 10 moves about worksite 28 completing these primary tasks, a satellite (not shown) or other tracking device may communicate with positioning device 22 to monitor the movement of machine 10. And, when machine 10 is positioned proximate calibration object 24, controller 20 may be manually triggered to initiate calibration of sensors 18. Alternatively, controller 20 may be automatically triggered to initiate calibration of sensors 18 based on a proximity of machine 10 to calibration object 24 or based on the performance of a specific primary task, if desired.

In the embodiment shown in FIG. 5, multiple calibration objects 24 may be included and located at worksite 28 for convenient access by machine 10. For example, two calibration objects 24 are shown, a first calibration object 24 being associated with a maintenance location 30, and a second calibration object 24 being associated with a turn-around or material deposition location 32. In this manner, as machine 10 periodically visits maintenance location 30 to complete a first primary task, for example to refill with fuel, sensors 18 located toward a front-end of machine 10 may utilize the first calibration object 24 for self calibration. Similarly, as machine 10 backs into the turn-around or material deposition location 32 after refueling to perform a second primary task, for example to turn around or to dump material, sensors 18 located toward a rear-end of machine 10 may be calibrated via the second calibration object 24. In this configuration, when a scanning range of sensors 18 located toward the front-end of machine 10 is substantially aligned with the first calibration object 24, the scanning range of sensors 18 located toward the rear-end of machine 10 may be aligned with the second calibration object 24. With this configuration, all of sensors 18 may be calibrated during completion of a single operation of machine 10 (e.g., during the refueling operation) without significant work interruption.

Figure 6:
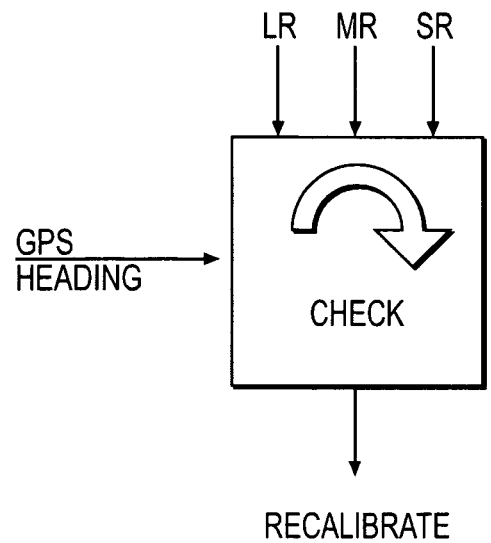
FIG. 6 is a diagrammatic illustration of an exemplary disclosed operation performed by the sensor calibration system of FIGS. 1 and 2 while the machine is mobile.

As shown in FIG. 6, information provided by one of sensors 18 may be utilized to help calibrate another of sensors 18 with or without calibration object 24. Specifically, when a machine is positioned in front of an obstacle, which may or may not be a feature 26 of calibration object 24, multiple sensors 18 onboard machine 10 may simultaneously detect a presence of that obstacle. That is, long range sensors 18L, medium range sensor 18M, and short range sensor 18S may all have a scan direction in front of machine 10 with overlapping scan ranges. As such, two or more of sensors 18 may simultaneously detect and range a single obstacle. And, when controller 20 compares feature characteristics of the detected obstacle, as provided by multiple sensors 18, differences in those feature characteristics may be observed. When the differences become significant (i.e., greater than a threshold margin), it can be concluded that one of sensors 18 require calibration. And, when three or more sensors 18 are simultaneously detecting and ranging the obstacle, a majority of sensors 18 may be in agreement with respect to the characteristic information, while a minority of sensors 18 may provide contradictory information. In this situation, the minority of sensors 18 providing the contradictory information may be recalibrated through the use of the transformation algorithms described above such that all characteristic information provided by sensors 18 comes into substantial agreement. In this manner, sensors 18 may be calibrated regardless of a proximity of machine 10 to calibration object 24 (i.e., comparison with pre-mapped feature characteristic information may not be required).

Figure 7:
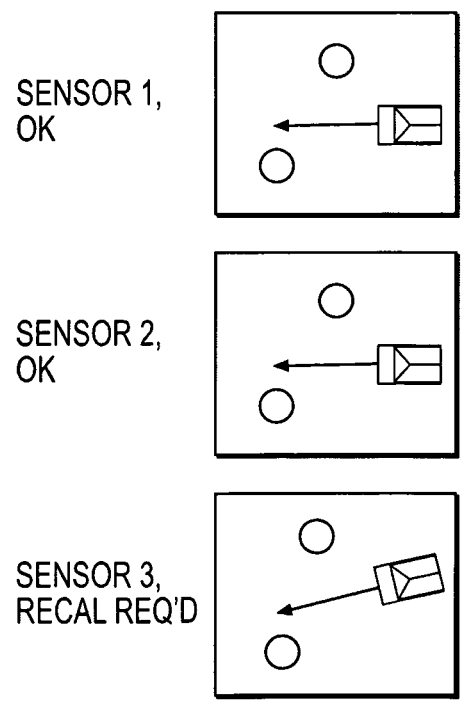
FIG. 7 is another diagrammatic illustration of an exemplary disclosed operation performed by the sensor calibration system of FIGS. 1 and 2 while the machine is mobile.

In one embodiment machine 10 may be moving during calibration of sensors 18. That is, regardless of a scan direction or an overlapping scan range, information provided by one or more sensors 18 at different times during movement of machine 10 may be compared with respect to a heading or trajectory of machine 10 to determine a need for and to complete calibration. For example, as shown in the images of FIG. 7, a front-mounted sensor 18 may detect and range one or more obstacles as machine 10 approaches the obstacles (upper image of FIG. 7). Similarly, a side-mounted sensor 18 may detect and range the same obstacles as machine 10 passes the obstacles (middle image of FIG. 7). Finally, a rear-mounted sensor 18 may detect and range the same obstacles as machine 10 moves away from the obstacles (lower image of FIG. 7). Controller 20 may then map the objects as detected by each sensor 18 with respect to the trajectory taken by machine 10. And, based on a difference in feature characteristics of the obstacles, a need for calibration may be observed. In the examples above, the rear-mounted sensor 18 is shown in the lower image of FIG. 5 to provide information that disagrees with information provided by the front- and side-mounted sensors 18. As such, it can be concluded that the rear-mounted sensor 18 requires calibration, and controller 20 may select the appropriate transformation algorithms described above for future use in conditioning information provided by the rear-mounted sensor 18 (i.e., controller 20 may select the appropriate transformation algorithm to calibrate the rear-mounted sensor 18). It is contemplated that controller 20 may similarly calibrate sensors 18 with overlapping scan ranges, if desired.

In another embodiment, information provided by sensors 18 of one machine 10 may be used to help calibrate sensors 18 of another machine 10. That is, some machines 10 may include a limited number of sensors 18, for example only a single sensor 18. As such, sensor calibration without the use of calibration object 24 and pre-mapped feature characteristic information may be difficult. However, it may be possible to compare feature characteristic information associated with an obstacle and provided by a sensor 18 of a first machine 10 to feature characteristic information associated with the same obstacle provided by a sensor 18 of a second machine 10, when position information of each machine 10 is taken into account. For example, the first machine 10 may stop proximate to or pass by a stationary obstacle at worksite 28, for instance a fuel tank or an earthen berm, and record feature characteristic and position information from sensor 18 and positioning device 22 associated with the first machine 10. Similarly, the second machine 10 may stop proximate to or pass by the same stationary obstacle and record the same feature characteristic and position information. Then, based on the position information, the feature characteristic information from each machine 10 may be compared to determine differences in the feature characteristic information. And, as described above, when the differences become significant, corresponding transformation algorithms may be selected and used by controller 20 for calibration. It is contemplated that controller 20 may have stored in memory and periodically update characteristic feature information for multiple stationary obstacles located at worksite 28, as recorded by many different sensors 18 mounted on many different machines 10 over a long period of time, so as to improve machine-to-machine calibration accuracy. It is contemplated that a single sensor 18 may similarly rely upon feature characteristic information previously generated by itself and recorded by controller 20 for later calibration, if desired.

INDUSTRIAL APPLICABILITY

The disclosed sensor calibration system may be applicable to any mobile machine that utilizes object detecting and ranging sensors. The disclosed sensor calibration system may help determine a need for sensor calibration, and provide in situ sensor calibration. In addition, the disclosed sensor calibration system may provide calibration without physical service of the sensor being required, and may do so with or without machine proximity to a specific calibration object. The disclosed sensor system may be used in conjunction with a machine having a single sensor or multiple sensors, and may be used without requiring the machine to be precisely positioned at a known calibration location.

It will be apparent to those skilled in the art that various modifications and variations can be made to the sensor calibration system of the present disclosure. Other embodiments of the sensor calibration system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A sensor calibration system for a mobile machine, comprising:
    a positioning device configured to determine a position of the mobile machine;
    a calibration object;
    a sensor configured to sense a characteristic of the calibration object from an actual sensing location of the sensor on the mobile machine and to generate a corresponding signal; and
    a controller in communication with the sensor and the positioning device, the controller including a plurality of maps including known characteristics determined at different positions of the mobile machine relative to the calibration object and sensed from a desired sensing location of the sensor on the mobile machine, the controller being configured to:
        communicate with the positioning device and select a map from the plurality of maps related to the position of the mobile machine with respect to the calibration object,
        compare the characteristic sensed from the actual sensing location of the sensor to the known characteristic from the map that was previously sensed from the desired sensing location of the sensor;
        determine a difference between the actual sensing location of the sensor and the desired sensing location of the sensor based on the comparison; and
        correct subsequent signals generated by the sensor at the actual sensing location based on the difference by applying one or more transformations to the signal.

2. The sensor calibration system of claim 1, wherein the positioning device is a global positioning device configured to determine a reference location on the mobile machine, the desired sensing location being determined as a function of the reference location.

3. The sensor calibration system of claim 2, wherein the desired sensing location includes a position and an orientation relative to the reference location.

4. The sensor calibration system of claim 1, wherein the calibration object includes a plurality of features, each feature having a different characteristic detectable by the sensor.

5. The sensor calibration system of claim 1, wherein the sensor is one of a RADAR sensor, a SONAR sensor, a LIDAR sensor, and a camera.

6. The sensor calibration system of claim 1, wherein a difference between the characteristic sensed from the actual sensing location and the known characteristic sensed from the desired sensing location corresponds with a shift of the actual sensing location in any of three orthogonal directions relative to the desired sensing location.

7. The sensor calibration system of claim 6, wherein the difference between the characteristic sensed from the actual sensing location and the known characteristic sensed from the desired sensing location also corresponds with a rotation of the actual sensing location about any of three orthogonal axis relative to the desired sensing location.

8. The sensor calibration system of claim 7, wherein the controller is configured to correct subsequent characteristics sensed from the actual sensing location by amounts corresponding to the shift and the rotation of the actual sensing location relative to the desired sensing location.

9. The sensor calibration system of claim 1, wherein the controller includes a memory having stored therein a plurality of transformation algorithms corresponding to the shift and the rotation differences between the actual sensing location and the desired sensing location.

10. The sensor calibration system of claim 1, wherein the controller includes a memory having stored therein the known characteristic as sensed by a plurality of sensor types from the desired sensing location.

11. The sensor calibration system of claim 1, wherein the controller is configured to correct subsequent signals only if the difference is greater than a threshold amount.

12. A method of calibrating a sensor mounted on a mobile machine, the method comprising:
positioning the mobile machine proximate a calibration object;
communicating with a positioning device to determine a position of the mobile machine with respect to the calibration object and selecting a map from a plurality of maps related to the position of the mobile machine with respect to the calibration object, wherein the plurality of maps include known characteristics determined at different positions of the mobile machine relative to the calibration object and sensed from a desired sensing location of a sensor on the mobile machine;
sensing with the sensor a characteristic of the calibration object from an actual sensing location of the sensor on the mobile machine;
comparing the characteristic sensed from the actual sensing location to the known characteristic associated with the desired sensing location;
determining a difference between the sensed characteristic and the known characteristic based on the comparison; and
correcting subsequent sensor input received from the actual sensing location based on the difference by applying one or more transformations to the input.

13. The method of claim 12, further including determining a global position of a reference location on the mobile machine relative to the calibration object, and calculating the desired sensing location as a function of the reference location.

14. The method of claim 13, wherein the desired sensing location includes a position and an orientation relative to the reference location.

15. The method of claim 12, wherein a difference between the characteristic sensed from the actual sensing location and the known characteristic corresponds with a shift of the actual sensing location in any of three orthogonal directions relative to the desired sensing location.

16. The method of claim 15, wherein the difference between the characteristic sensed from the actual sensing location and the known characteristic corresponds with a rotation of the actual sensing location about any of three orthogonal axis relative to the desired sensing location.

17. The method of claim 16, wherein correcting subsequent sensor input includes transforming future characteristics sensed from the actual sensing location by amounts corresponding to the shift and the rotation of the actual sensing location relative to the desired sensing location.

18. The method of claim 12, further including storing the characteristic sensed from the actual sensing location in memory as a known characteristic when the actual sensing location substantially matches the desired sensing location.

* * * * *